United States Patent
Levy et al.

(10) Patent No.: US 10,629,078 B1
(45) Date of Patent: *Apr. 21, 2020

(54) METHOD, SYSTEM AND PRODUCT FOR VEHICLE PLACEMENT

(71) Applicant: ANAGOG LTD., Tel Aviv (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,569

(22) Filed: Dec. 6, 2019

Related U.S. Application Data (63) Continuation of application No. 15/521,728, filed as application No. PCT/IL2015/051053 on Oct. 28, 2015, now Pat. No. 10,529,234.

(60) Provisional application No. 62/069,928, filed on Oct. 29, 2014.

(51) Int. Cl.
*G08G 1/14* (2006.01)
*G07B 15/02* (2011.01)
*G08G 1/0968* (2006.01)

(52) U.S. Cl.
CPC ....... *G08G 1/147* (2013.01); *G08G 1/096811* (2013.01); *G08G 1/144* (2013.01)

(58) Field of Classification Search
CPC ..................................................... G08G 1/147
See application file for complete search history.

(56) References Cited

U.S. PATENT DOCUMENTS

| | | | |
|---|---|---|---|
| 2008/0048885 A1* | 2/2008 | Quinn | G08G 1/143 340/932.2 |
| 2012/0161984 A1 | 6/2012 | Amir | |
| 2014/0249742 A1 | 9/2014 | Krivacic et al. | |
| 2015/0081362 A1* | 3/2015 | Chadwick | G06Q 10/06311 705/7.14 |
| 2015/0149320 A1* | 5/2015 | Smirin | G06Q 30/0633 705/26.8 |
| 2016/0096508 A1* | 4/2016 | Oz | H04L 67/125 701/36 |
| 2016/0307288 A1 | 10/2016 | Yehuda | G06Q 10/02 |

OTHER PUBLICATIONS

PCT/ISR/210 Search Report dated Feb. 10, 2016 (pp. 2).

* cited by examiner

*Primary Examiner* — Joseph H Feild
*Assistant Examiner* — Pameshanand Mahase
(74) *Attorney, Agent, or Firm* — Tutunjian & Bitetto, P.C.

(57) ABSTRACT

A method, system and product for computer-aided hunting for location-based events. The computer-aided hunting may be based on providing an automatic suggestion of a proposed waiting location. A method includes computing, a proposed location for a driver of a vehicle, wherein the proposed location is an approximated location where the vehicle can wait until a location-based event occurs occurring in a geographical area. The computing includes: computing, for each potential location within the geographical area, computing a measurement indicative of an estimated elapsed time until the location based event occurring in a proximity of the potential location; and selecting the proposed location from the potential location based on the computed measurements, and providing the proposed location to the driver.

24 Claims, 6 Drawing Sheets

METHOD, SYSTEM AND PRODUCT FOR VEHICLE PLACEMENT

CROSS-REFERENCE TO RELATED APPLICATION

This application is a Continuation of co-pending U.S. patent application Ser. No. 15/521,728 filed on Apr. 25, 2017 entitled Computer-Aided Event Hunting, which is a national phase entry of PCT/IL2015/051053 filed Oct. 28, 2015, which claims the benefit of U.S. Provisional Application No. 62/069,928 filed Oct. 29, 2014, entitled "COMPUTER-AIDED PARKING SEARCHING", all of which is hereby incorporated by reference in its entirety without giving rise to disavowment.

BACKGROUND

Finding a parking spot is many times a tiresome work. When searching for an available parking spot, one may drive around in circles in the hunt for a free parking spot or to identify a pedestrian who is about to enter a vehicle and vacate a parking spot. Another alternative strategy for finding a parking spot may be to stop the vehicle in one location and wait until a vehicle vacates a parking spot in its vicinity.

BRIEF SUMMARY

One exemplary embodiment of the disclosed subject matter is a computer-implemented method comprising: computing, by a processor, a proposed location for a driver of a vehicle, wherein the proposed location is an approximated location where the vehicle can wait until a location-based event occurs occurring in a geographical area, wherein said computing comprises: computing, for each potential location within the geographical area, computing a measurement indicative of an estimated elapsed time until the location based event occurring in a proximity of the potential location; and selecting the proposed location from the potential location based on the computed measurements; and providing the proposed location to the driver.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to compute and suggest an optimal spot for waiting until a location-based event occurs.

One class of embodiments in accordance with the disclosed subject matter relates to search for parking. An effectiveness of a driver waiting in a fixed location in the hopes of a vehicle vacating a parking spot may be dependent on the choosing of the fixed location.

Another class of embodiments may relate to waiting until being summoned to provide a service for a client. In one such embodiment, a driver having an app, such as Uber™, GetTexi™, or the like, may be waiting to receive a client request. In some cases, client requests may be routed based on proximity to the driver, so as to provide precedence to drivers that are near-by. Furthermore, the driver may wish to reduce potential driving time/distance until reaching the client when summoned.

One technical solution is to automatically determine one or more proposed locations for the driver to wait in. The selection may be made based on some predetermined metric. In some exemplary embodiment, a target function that is based on the predetermined metric may be optimized. In some exemplary embodiments, some locations provide better accessibility to other locations and may be preferred due to such advantage. In some exemplary embodiments, the proposed location may be different at different times, such as taking into account historic patterns of the location-based events.

In the parking embodiment, some locations provide dominance over a larger number of parking spots. Some locations provide dominance over parking spots that tend to vacate more frequently than others. Some locations provide dominance over an inventory of occupied parking spots in a parking system which issues parking vacated events. Each such metric may be used for selecting the proposed location.

In the service embodiment, some locations may provide dominance over locations from which users tend to order the service. For example, corporate buildings may tend to order more taxis than residential buildings, and as such dominating over 20 corporate buildings may be preferable to dominating over 60 residential buildings. In some exemplary embodiments, the dominance may take into expected demand of the service, which may be influenced, for example, by time of day, time of week, season, weather information, or the like. In some exemplary embodiments, a mobile device, such as a smartphone, a Personal Digital Assistant (PDA) or the like, may be utilized to allow the driver to interact with a computerized system. The system may compute, either in an offline manner in a batch process or on-the-fly and on demand, a measurement value for potential locations. The measurement may indicate an estimated elapsed time until a location based event is expected to occur in proximity of the potential location. Proximity may be a location that is close enough so as to allow the driver to reach the location in time for the event to still be relevant (e.g., before someone else takes the vacated parking spot, before another taxi driver picks up the customer, or the like). Additionally or alternatively, proximity may be a location that is sufficiently close so as to allow the driver to take part in a matching algorithm matching between the driver and the user associated with the event, such as in case of a customer requesting service, another driver adding her parking spot to a parking auction system, or the like.

In some exemplary embodiments, the proposal may be computed based on a target location or selected waiting areas. In some exemplary embodiments, the driver may provide a target destination, and the proposal may be computed in the geographic area of the target destination, such as within a radius of about 2-5 miles, of 5 minutes drive, or the like, from the target destination. In some exemplary embodiments, the driver may manually provide the target destination, such as by providing the destination to a navigation system. Additionally or alternatively, the system may infer the destination based on the history of the driver and optionally similar drivers.

In some exemplary embodiments, a driver may indicate manually that she wishes to receive the proposal. As an example, the driver may indicate she is searching for a parking spot. Additionally or alternatively, the system may determine automatically, such as based on sensed movements of the vehicle, mobility information extracted from the mobile device of the driver, a status of the driver (e.g., taxi availability indicator—occupied, off duty and available), that the driver requires a proposed location.

In one example, sensors of a mobile device, such as GPS and accelerometer, may be utilized to identify that the vehicle is driving in a pattern consistent with searching for parking or looking for a client.

One technical effect of utilizing the disclosed subject matter is to reduce driving time, driving distance, fuel consumption or the like when the location-based event occurs. In some exemplary embodiments, the reduction is achieved by a-priori having the driver await in an optimal location. In some exemplary embodiments, the chances of the driver being able to timely and efficiently respond to the location-based event increases, thereby increasing likelihood the driver will benefit from the event, such as by timely reaching a vacated parking spot, timely reaching a customer, or the like.

The disclosed subject matter may also be applicable to additional domains. For clarity of explanation the description below focuses on the above-mentioned two classes of embodiments: one relating to a human driver waiting for parking spot and another relating to a human driver waiting for a customer-initiated event, such as calling a taxi. Additional embodiments may include, for example, an autonomous car that requires a waiting location until a parking spot is vacated. In such an embodiment, the driver may be a non-human driver, such as a software agent directing the autonomous car. In some exemplary embodiments, in the autonomous car embodiment, parking spots may be reserved based on a metric such as reserving the spot to the closest car to the vacated spot. Another embodiment may include a place for valet parking service to wait at. Another embodiment may relate to delivery vehicle (e.g., car, motorcycle, or the like) waiting for a delivery from restaurants in a geographical area. Another embodiment may include location for emergency vehicles to wait in, such as ambulances or police cars. The locations may be selected so as to provide effective distribution of the emergency vehicles over a city so as they may be able to respond and promptly arrive to locations which are unknown in advance. In some exemplary embodiments, the location of one emergency vehicle in such an embodiment, may also be affected by the location of other vehicles (e.g., to take into account a distribution of the fleet), on probability that emergency events will be triggered at different locations (e.g., historic database may be used to determine likelihood in location A is twice as much as location B, or the like).

Figure 1:
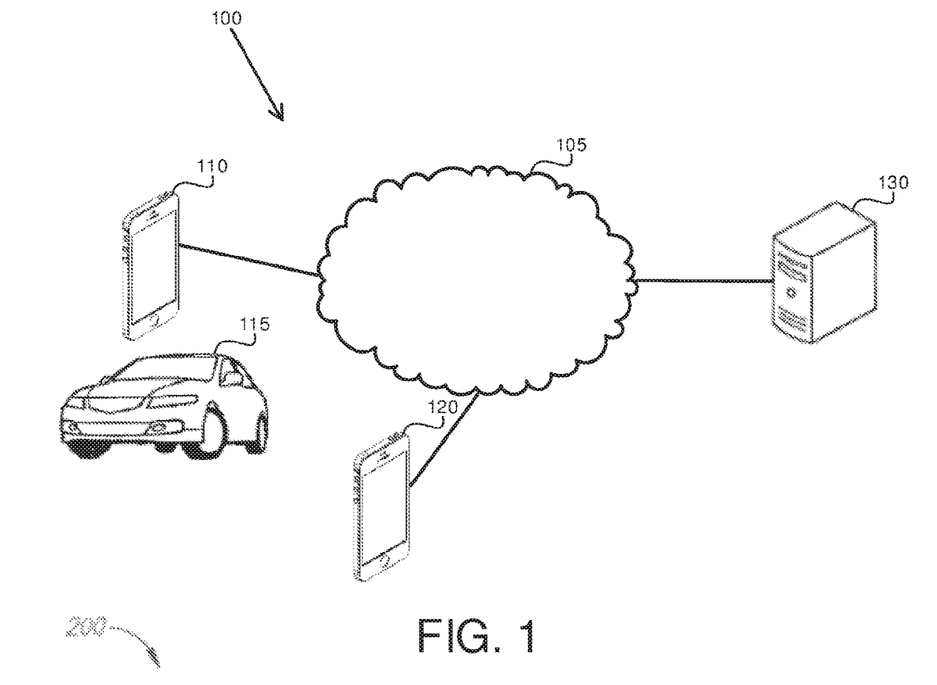
FIG. 1 shows an illustration of a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

Computerized environment 100 comprises a plurality of computing devices, such as Mobile Device 110 associated with a driver of Vehicle 115, Mobile Device 120, Server 130, or the like. The computing devices are inter-connected and communicate with one another via Network 105, such as the Internet, an intranet, a Local Area Network, a Wide Area Network, or the like.

Driver (not shown) of Vehicle 115 may use Mobile Device 110 to receive a proposed location in which to wait. In some exemplary embodiments, the driver may indicate to Mobile Device 110 that the driver enters a waiting status and therefore requires a proposed waiting location. Additionally or alternatively, Mobile Device 110 may determine automatically that the driver has entered or is about to enter a waiting status. As an example, Mobile Device 110 may determine using its positing sensors, accelerometer, or the like, a mobility status of the device, such as "driving". Device 110 may further determine that the user is attempting to reach a target location, such as based on navigation software being used to reach a destination, based on calendar information available to Device 110, based on driving pattern that is indicative of the driver searching for a parking spot or for an incidental customer along its route (e.g., driving slowly near places where potential customers/parking spots are found and driving fast in other places, such as highways), based on a status indicator of Vehicle 115 (e.g., a taxi available status indicator), or the like. In some exemplary embodiments, Device 110 may provide a proposed location in case a driver approaches her target destination and in case it is determined that the driver does not have a parking spot at her target destination (e.g., based on historic information indicative of reserved parking spot or of usage of a same parking lot, based on historic information indicative of the driver searching for on-street parking near the target destination, or the like).

In some exemplary embodiments, Device 110 may determine the proposed location itself, or alternatively request such proposal be provided by Server 130. In some exemplary embodiments, the proposed location may be based on computed measurements or scores of each potential location within a geographical area (e.g., within a radius of predetermined size around the target destination, within a radius of predetermined size around the current location of Vehicle 115, or the like). The scores may be computed beforehand, such as in a batch offline process. Additionally or alternatively, the scores may be computed when needed.

The computed proposed location (or several alternative proposed locations, such as top three, top five, or the like) may be provided to the driver. Driver may accept the proposed location (or select an accepted proposed location). In response to such input, Device 110 may provide navigation instructions useful for leading driver to the location.

Upon reaching the location, the driver may wait until an event occurs. In some exemplary embodiments, the driver may be notified of an occurrence of a location-based event she is waiting for via Mobile Device 110.

As an example, Device 110 may be used to indicate a parking spot was vacated, such as based on crowdsourced information, based on sensors spread in parking spots, or the like.

In some exemplary embodiments, a notification of the occurrence of the event may be issued by Server 130, by Mobile Device 120, or the like. In some exemplary embodiments, Server 130 may indicate a potential customer and only upon the driver accepting the customer, the event is associated with the driver and is made unavailable to competing drivers, such as in case of a taxi driver accepting a ride.

In some exemplary embodiments, Server 130 may be configured to initially expose an event associated with a potential customer to drivers in proximity of the customer (e.g., within a radius of one mile), and as long as no match is found, expose the event to additional drivers that are more distant from the customer. The increased exposure may be achieved by increasing a radius around the customer in which drivers are notified of the event, such as increasing the radius in one mile at each interval, increasing the radius to increase a number of exposed drivers by at least about 10% or at least an absolute number (e.g., ten drivers) or the like. In such an embodiment, the driver may benefit from waiting in locations where there are many potential customers.

In some exemplary embodiments, the determination of the proposed location may be based also on the number of other drivers that were directed to wait in locations. For example, if many drivers were diverted to location A to wait for an occurrence of a location-based event nearby, the score of location A may decrease for a predetermined timeframe, as long as the drivers are detected to still be waiting in location A, or the like. In some exemplary embodiments, location B may accordingly be preferred as its score becomes higher than that of location A which may initially have been assigned a higher score. In some exemplary embodiments, distributing the drivers in different waiting locations may be useful to avoid having many drivers compete over a same set of potential events. It may be more efficient to have different drivers wait for events in different places to increase the aggregated waiting time of all drivers. Additionally or alternatively, in case of location-based events associated with customers, distributing the drivers may be useful to reduce waiting time of the customers until a driver arrives to their location.

Figure 2:
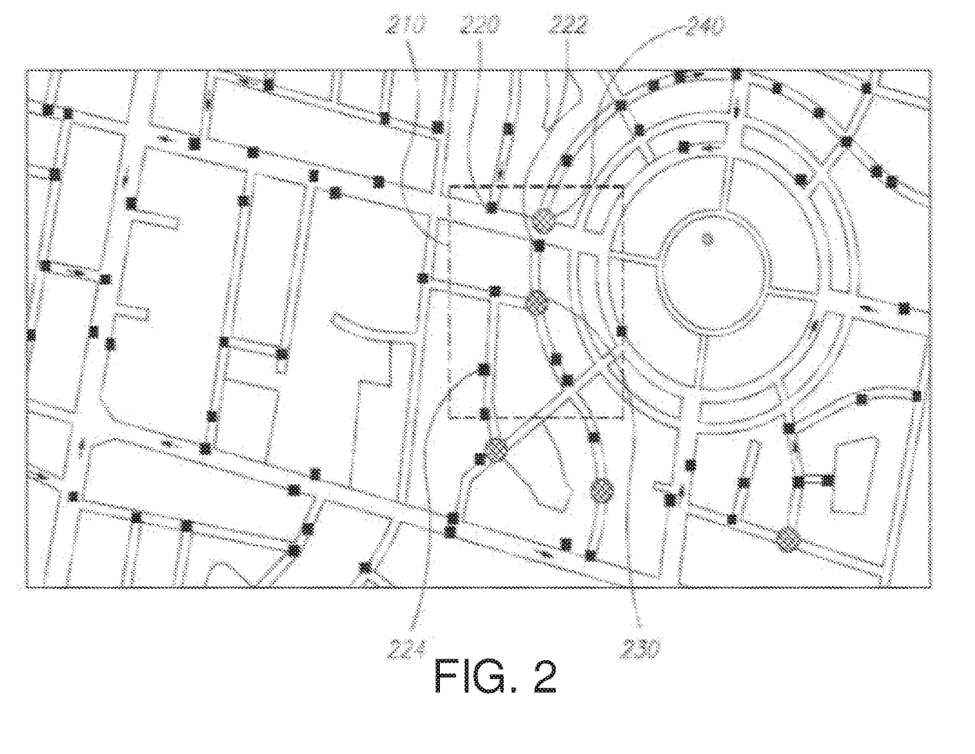
FIG. 2 shows an illustration of a Graphical User Interface (GUI), in accordance with the disclosed subject matter.

Referring now to FIG. 2 showing an illustration of a Graphical User Interface (GUI), in accordance with the disclosed subject matter.

Interactive Map 200 displays a Geographical Area 210 in which a proposed location is searched for. In some exemplary embodiments, Geographical Area 210 may be determined based on a target destination, explicitly inputted by the driver or automatically deduced without explicit driver input.

Potential locations, such as junctions, locations within junctions, or the like may be determined within Area 210. As an example, Locations 220, 222, 224, 230 and 240, may be potential locations.

In some exemplary embodiments, for each location a score is computed. The score may be computed on demand or in advance. In some exemplary embodiments, the score may be based on Area 210. In some exemplary embodiments, a score may be based on accessibility measurement which is indicative of accessibility from the potential location to each other potential location. In some exemplary embodiments, accessibility measurement may be based on accessibility only to locations within Area 210.

In some exemplary embodiments, Location 230 may be proposed to the driver. In some exemplary embodiments, one or more alternative locations may be proposed as well, such as 240. In some exemplary embodiments, proposed locations may be displayed in a visually distinct manner in the GUI, such as exemplified in Map 200.

Figure 3:
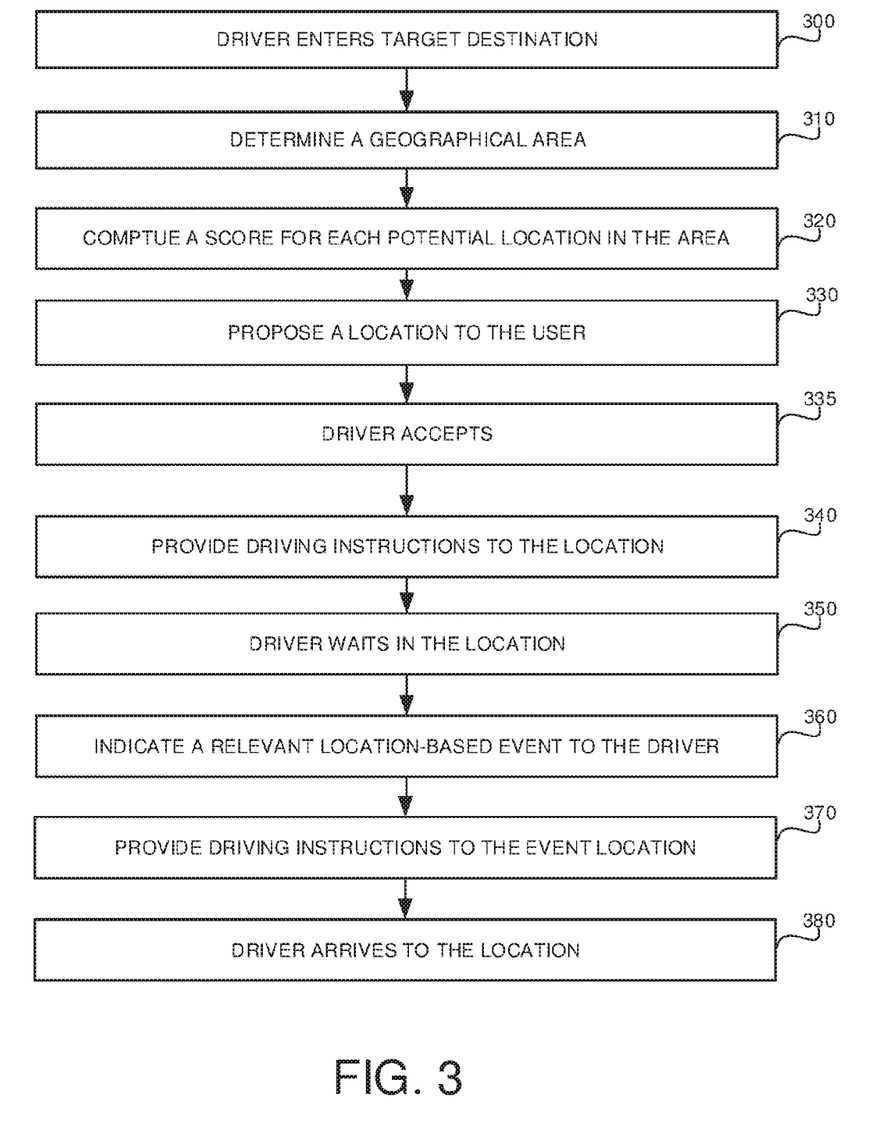
FIG. 3 shows a flowchart diagram of a method, in accordance with some embodiments of the disclosed subject matter.

Referring now to FIG. 3, showing a flowchart diagram of a method in accordance with some embodiments of the disclosed subject matter.

In Step 300, driver may enter a target destination, such as via a navigation software executed by a device, such as Mobile Device 110.

In Step 310, a geographical area may be determined. The area may be determined based on the target destination such as based on a predetermined distance, driving time, or the like from the target destination. Additionally or alternatively, the geographical area may be determined based on the current location of the vehicle, such as determined using positioning modules (e.g., a GPS receiver of Mobile Device 110, network-based positioning techniques, or the like). The geographical area may define a set of potential locations. In some exemplary embodiments, each location with the area is a potential location. In some exemplary embodiments, some locations may be filtered out such as any location dominated by another location. In some exemplary embodiments, only locations at road junctions may be taken into account.

In Step 320, a score for each potential location may be computed. The score may be computed on demand. Additionally or alternatively, the score may be computed in advance and merely used in the method of FIG. 3. Additionally or alternatively, an initial computation, which may have been performed in advance, may be adjusted to compute the score, such as by taking into account the geographic area.

In some exemplary embodiments, the score may be computed while taking into account location of other vehicles. As an example, the location of other competitors may affect the location in which a taxi driver may wish to wait so as to reduce potential competition over a customer in an area. As another example, location of other fleet members may be taken into account so as to provide a desired level of coverage over areas, such as having sufficient number of taxis in a commercial area, having uniform distribution of emergency vehicles over a city, having a uniform effective distribution of emergency vehicles over a neighborhood (e.g., taking into account likelihood of an event in each location), or the like.

The score may be based on a based on an accessibility measurement. The accessibility measurement may be a measurement which computes accessibility to other streets or locations in the area. A location having highest accessibility measurement may reduce effective driving time or road distance to all other locations in the area such that if the driver is notified of an event, he has a relatively short path/time to get to the location of the event. In some exemplary embodiments, the accessibility measurement may be indicative of accessibility from the potential location to locations that can be potentially associated with occurrences of the location-based event.

In some exemplary embodiments, for each potential location in the area, a driving time/road distance to all other potential locations in the area is computed. In some exemplary embodiments, a matrix of N×N is computed. A cell (i,j) in the matrix comprises the driving time/road distance from potential location i to potential location j. In some exemplary embodiments, the potential location that has a significantly better access than other junctions in its surrounding are provided as one or more proposal to the driver. In some exemplary embodiments, the access measurement between a potential location and another potential location may depend on additional information such as traffic information in the route therebetween, road width in the route therebetween, a number of traffic lights and estimated waiting time in traffic lights in the route therebetween, traffic routes in the route therebetween (e.g., car pool lane, public transportation/ emergency vehicle lane, or the like), weather information, roads constructions in the route therebetween, special events (e.g., a parade) expected to occur therebetween, or the like. In some exemplary embodiments, for each potential location the matrix defines a vector of coefficients. The potential location may be selected based on a selection criterion such as a minimal sum of coefficients, a minimal average distance, a minimal mean distance, or the like. In some exemplary embodiments, the selection criterion may take into account a standard deviation and prefer a smaller standard deviation value.

The score may be based on dominance measurement. In some exemplary embodiments, the dominance measurement may be indicative of a number of locations that are dominated by the location and potentially aggregated probability that an event will occur in such locations. In some exemplary embodiments, the dominance measurement may be indicative of a number of parking spots that are dominated by the potential location. The dominance measurement may be indicative of an accumulated probability that a parking spot dominated by the potential location will be vacated within a predetermined timeframe, such as about five minutes, about ten minutes, about twenty minutes, or the like. The dominance measurement may be a measurement which measures how many parking spots are dominated by the location and their estimated quality. A parking spot is said to be dominated if, in case a vehicle vacates the parking spot, the driver can drive to the parking spot and park in a relatively short time frame and with a low probability that another driver will beat him to the parking spot. The dominance measurement may take into account an estimated probability that the parking spot will vacate. The estimated probability may be computed based on the past parking sessions at the parking spots, which may have been reported to the system (e.g., by mobile devices of drivers, as part of crowd-sourcing a community of drivers), based on current inventory of occupied parking spots in a parking monitoring system, or the like. Additionally or alternatively, the dominance measurement may take into account parking policy at the parking spot, which may prohibit the driver from parking (at the same time, or all the time). The dominance measurement may measure a number of parking spots that are relevant to the driver (e.g., in size, in parking policy, or the like) and take into account the estimated probability. As an example, the computation may be $\Sigma p_i$, where pi is the probability that parking i will vacate in the next timeframe, and where only the relevant and dominated parking spots are accounted for.

It will be noted that the above explanation of the dominance metrics is provided with respect to vacated parking events. However, the dominance metric is not limited to such embodiment alone. As an example, the dominance metric may be useful for customer request events (e.g., for an Uber™ driver). Location A dominates location B in such an embodiment, if a driver at Location A is a potential match of a customer ordering service in location B. In some exemplary embodiments, dominance would be determined only for locations which are provided the first opportunity to accept the customer request (e.g., in case of an incremental increase in exposure of the request to additional drivers). Additionally or alternatively, dominance may be determined for locations which are provided the opportunity to accept the customer request in a predetermined time interval, a predetermined number of increments, or the like. In some exemplary embodiments, locations near office buildings may be have greater quality during week days than residential locations, and vise versa at weekends. Historic information may be used to determine an estimated probability of a customer request event being issued in each location. In some exemplary embodiments, the value of historic events may also be taken into account, such as to bias the waiting location to a location which covers customers that have transactions of greater value.

As another example, in a case of a delivery vehicle, the dominance measurement may be dominance over restaurants locations, taking into account opening hours (e.g., only opened restaurants), historical demand patterns from each restaurant, or the like.

As yet another example, in case of emergency vehicles, dominance measurement may relate to public places (e.g., schools, hospitals, or the like). The dominance measurement may take into account historic demand patterns for assistance of emergency vehicles at different locations at relevant times.

In Step 330, a location may be proposed to the driver. In some exemplary embodiments, a GUI, such as depicted in FIG. 2, may be used to visualize the one or more proposed locations. In some exemplary embodiments, a mobile device, such as 110 of FIG. 1, may be used to provide the driver with the proposal. In some exemplary embodiments, each proposed location may be displayed with a graphic indicator showing an estimated quality, estimated waiting time, or the like.

In Step 335, the driver may use a GUI to indicate she accepts the proposal. In some exemplary embodiments, the driver may select one proposal out of a set of alternative proposals.

In Step 340, navigation instructions may be provided to the driver to assist her in reaching the location. Navigation instructions may be updated based on a current position of the driver, such as determined using a GPS or other positioning devices. In some exemplary embodiments, the navigation instructions may be provided on top of a GUI displaying a map, such as depicted in FIG. 2. In some exemplary embodiments, during navigation, location-based events may occur. In some cases, such events may be reported to the driver (e.g., a customer request event nearby may be reported) while on other cases, such events may be ignored as irrelevant (e.g., parking vacated event occurring nearby but in a distance from a target destination).

In Step 350, upon the driver reaching the location with her vehicle, the driver may wait in the location.

In Step 360, in response to an occurrence of a location-based event that is relevant for the driver (e.g., the type of events the driver is waiting for), the event may be indicated to the driver. In some exemplary embodiments, a mobile device may issue an alert, such as using a push notification message, indicating the event. The driver may accept or reject the event. In some exemplary embodiments, in case the event is issued to many drivers using the same system, after one driver accepts the event, the event becomes defunct and invalid for acceptance for other drivers. In such a scenario, the event may not be displayed to other drivers, may be removed from the display of other drivers, or the like. As an example, the event may indicate a vacated parking event occurring in a location which the driver may reach in time while it is still valid. The event may relate to an on-street parking. Acceptance of the event by any driver, may cause the event to become invalid for acceptance for other drivers, thereby avoiding sending two or more drivers to the same location. In some exemplary embodiments, the acceptance may be part of an auction process, a matching process, or the like, which may cause a one-to-one matching between driver and event.

In Step 370, driving instructions to the event location may be provided to the driver, thereby leading her to the location of the event. In some exemplary embodiments, if during navigation it is determined that the event is no long relevant (e.g., customer canceling the request, detecting the parking spot becomes occupied, or the like), navigation may be terminated before reaching the destination. In some exemplary embodiments, Steps 320-370 may be performed again.

In Step 380, the driver arrives at the location of the event. In case the event is no longer relevant, the driver may manually so indicate. In some exemplary embodiments, manual indications may be used in the future, such as to improve determination of what is considered a potentially relevant event for a driver (the driver herself, similar drivers with similar driving patterns, all other drivers, or the like).

Figure 4:
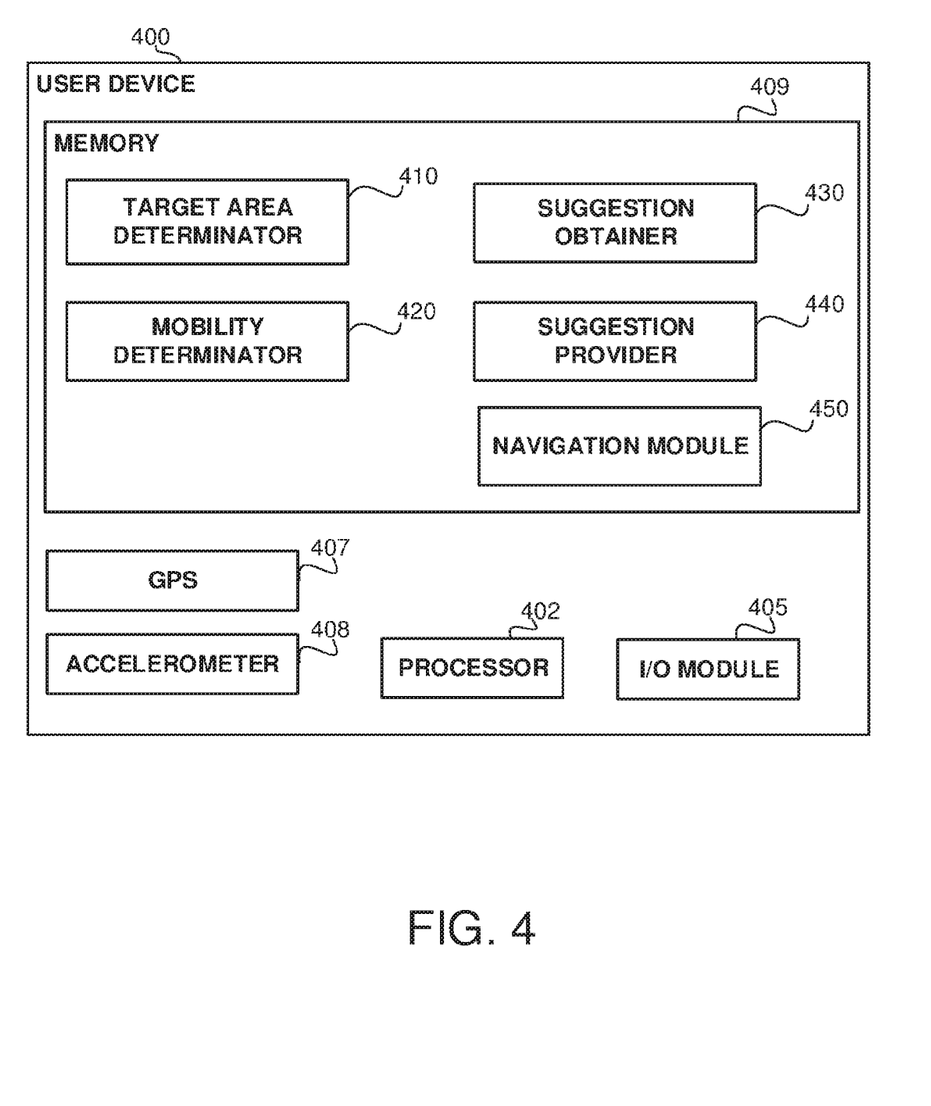
FIG. 4 shows a block diagram of a device, in accordance with some embodiments of the disclosed subject matter.

Referring now to FIG. 4 showing a block diagram of a user device, in accordance with some exemplary embodiments of the disclosed subject matter. User Device 400, such as 110 of FIG. 1, may be configured to provide proposals for a driver, in accordance with the disclosed subject matter.

In some exemplary embodiments, Processor 402 may be a Central Processing Unit (CPU), a microprocessor, an electronic circuit, an Integrated Circuit (IC) or the like. Processor 402 may be utilized to perform computations required by the User Device 400 or any of it subcomponents.

In some exemplary embodiments of the disclosed subject matter, I/O Module 405 may be utilized to provide an output to and receive input from a user. In some exemplary embodiments, I/O Module 405 may be used to display information to a user via a screen, to receive input via an input device, such as keyboard, touch screen, pointing device, or the like.

In some exemplary embodiments, Global Positioning System (GPS) Receiver 407 may be configured to determine a position of User Device 400. In some exemplary embodiments, other positioning techniques may be utilized in addition to or instead of utilizing signals from satellites of the GPS.

In some exemplary embodiments, Accelerometer 408 may be configured to provide acceleration measurements of User Device 400. Acceleration measurements may be useful in determining mobility status of User Device 400, such as walking status, driving status, parking status, or the like.

In some exemplary embodiments, Memory 409 may be a hard disk drive, a Flash disk, a Random Access Memory (RAM), a memory chip, or the like. In some exemplary embodiments, Memory 409 may retain program code operative to cause the Processor 402 to perform acts associated with any of the subcomponents of the User Device 400

Target Area Determinator 410 may be configured to determine a target geographical area in which the location is to be determined. Target Area Determinator 410 may calculate the area based on the target destination of the driver, based on current location, such as determined by GPS Receiver 407, or the like. In some exemplary embodiments, target destination may be automatically determined by Target Area Determiantor 410, such as by accessing a calendar of the driver (not shown), which may be stored on Memory 409, based on past trips made by the driver taking into account current time, current location, or the like. Additionally or alternatively, Target Area Determinator 410 may obtain the target destination from the user, such as by the user inputting the target destination to User Device 400. In one embodiment, the user may use a navigation software and may input the target destination to the navigation software. Target Area Determinator 410 may obtain the target destination from the navigation software.

Mobility Determinator 420 may be configured to determine a mobility status of User Device 400. Mobility status may be determined using one or more sensors, including but not limited to GPS Receiver 407, Accelerometer 408, or the like. In some exemplary embodiments, Mobility Determinator 420 may determine a mobility status between a driving status or a non-driving status. Additionally or alternatively, additional statuses such as a walking status, a parking status, entering to parking status, exiting from parking status, or the like, may be determined.

Suggestion Obtainer 430 may be configured to obtain one or more suggestions to the driver. In some exemplary embodiments, Suggestion Obtainer 430 may utilize Target Area Determinator 410 to determine a scope of the area in which the suggestion is provided. In some exemplary embodiments, Suggestion Obtainer 430 may compute the suggestions itself or alternatively query a server, such as 130 of FIG. 1, to obtain suggestions therefrom. In some exemplary embodiments, the suggestions may be computed by computing a score for each potential location and selecting one or more locations having the highest scores.

Suggestion Provider 440 may be configured to provide suggestions obtained by Suggestion Obtainer 430 to the user.

Navigation Module 450 may be configured to provide navigation instructions to the proposed location. Additionally or alternatively, Navigation Module 450 may be configured to provide navigation instructions to a location of an occurrence of an event, such as to the parking spot in which the vacating parking event was reported.

Figure 5A:
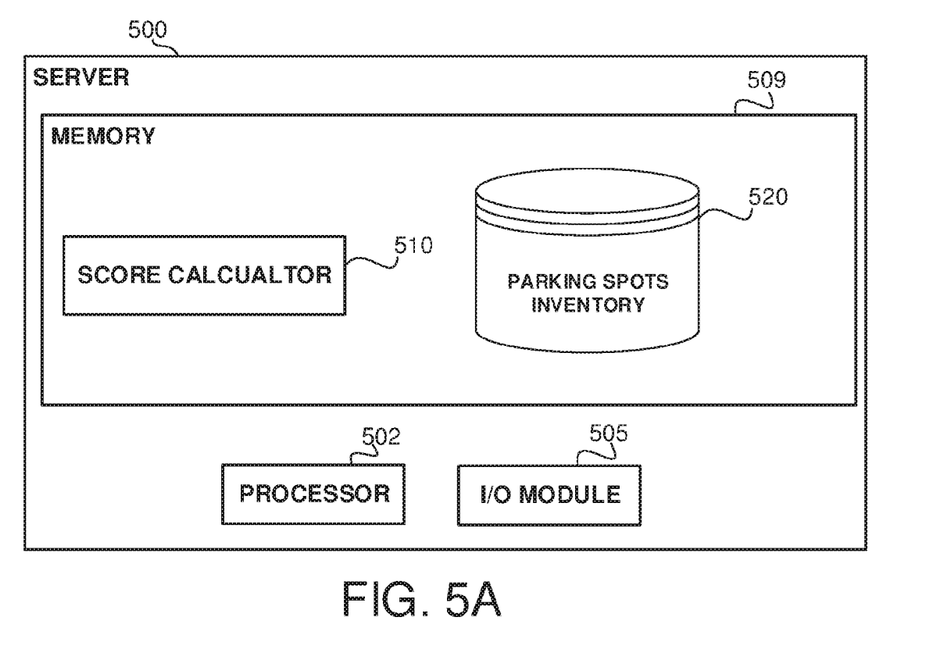
FIG. 5A shows a block diagram of a server, in accordance with some embodiments of the disclosed subject matter.

Referring now to FIG. 5A showing a block diagram of a server, in accordance with some exemplary embodiments of the disclosed subject matter. Server 500 may be configured to compute scores for potential locations to provide a suggested waiting location until a parking vacated event occurs. In some exemplary embodiments, some or all of the components of Server 500 may be implemented locally on a user device, such as 400. Additionally or alternatively, Server 500 may provide a processing backend of a system in accordance with the disclosed subject matter. Additionally or alternatively, functionality of Server 500 may be provided using cloud-computing platform.

Server 500 may comprise Processor 502, similar to Processor 402 of FIG. 4, Memory 509, similar to Memory 409, or the like. Server 500 may comprise I/O Module 505, similar to I/O Module 405 of FIG. 4. I/O Module 505 may be used to provide bi-directional communication to user devices, such as 400 of FIG. 4.

In some exemplary embodiments, Score Calculator 510 may be configured to compute a score for each potential location. In some exemplary embodiments, Score Calculator 510 may be utilized on demand when a proposed location is searched for, in advanced in a batch process, or the like. In some exemplary embodiments, Score Calculator 510 may depend on the target area which define the potential locations, as a score of a potential location may be based on its accessibility to other potential locations. In some exemplary embodiments, Score Calculator 510 may take into account patterns of past events, current location of other vehicles, current traffic information, or the like.

In an embodiment relating to parking spots, Parking Spots Inventor 520 may be utilized by Score Calculator 510. Parking Spots Inventory 520 may be a data repository comprising inventory of occupied and vacant parking spots. In some cases, dominating over a large number of parking spots that are in the inventory may be preferred and may bias the score to be relatively high. In some exemplary embodiments, Inventory 520 may comprise a subset of the available parking spots that are monitored by one or more systems emitting parking vacated events. As such, the inventory of occupied parking spots in the vicinity of a location may be useful to determine likelihood of an event occurring in the near future.

Figure 5B:
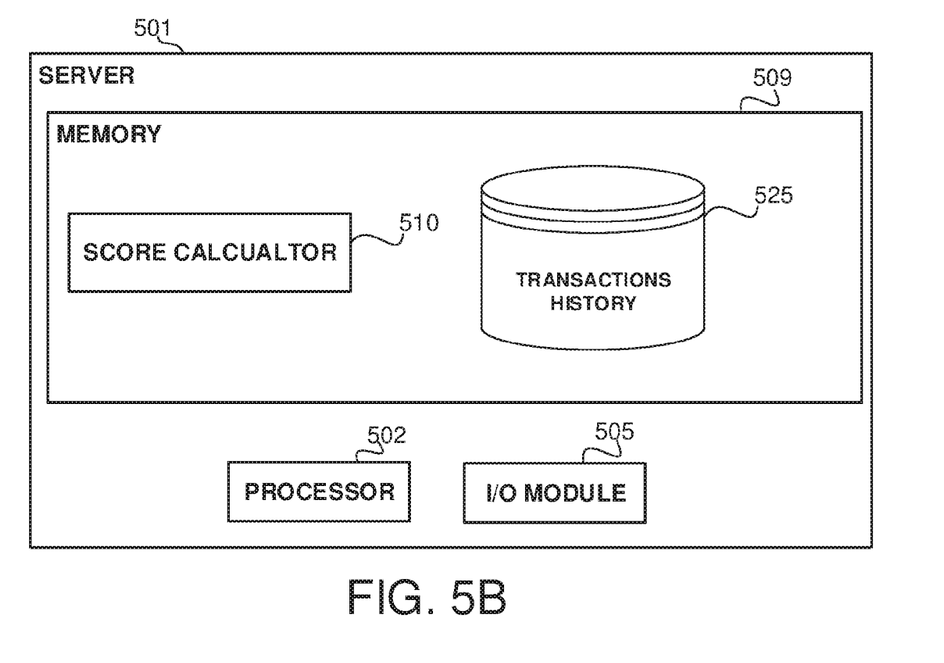
FIG. 5B shows a block diagram of a server, in accordance with some embodiments of the disclosed subject matter.

FIG. 5B shows a block diagram of an alternative server, in accordance with some exemplary embodiments of the disclosed subject matter. Server 501 may be similar to Server 500 and may relate to customer request events. Transaction History 525 may be a repository retaining historic information on past customer request events. Score Calculator 510 may be configured to extract event patterns from Transaction History 525 and accordingly compute scores which depend on such historic patterns which may be used for predicting future occurrences of similar events.

Figure 6:
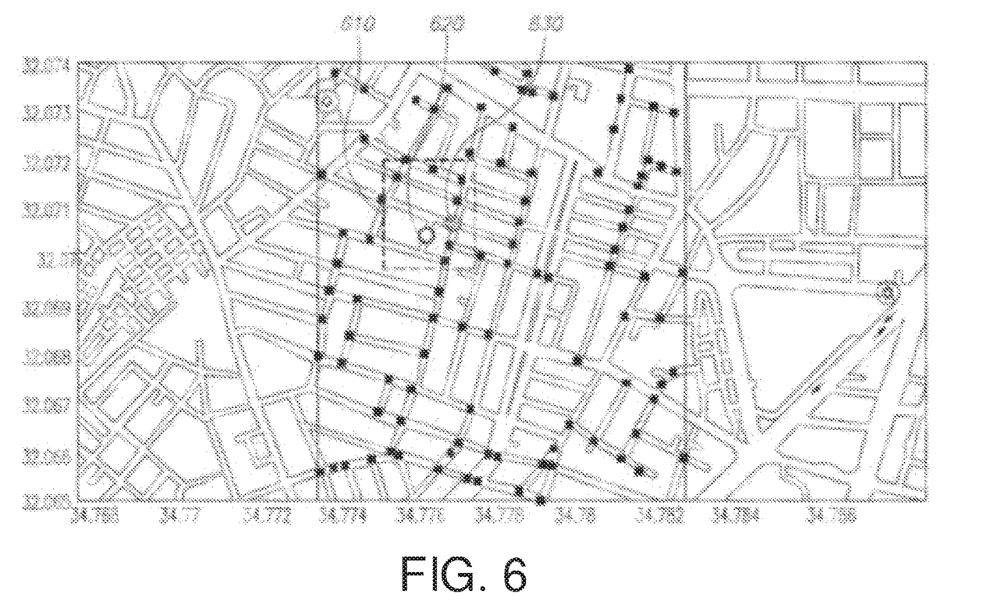
FIGS. 6 and 7A-7C show illustrations of maps, in accordance with some embodiments of the disclosed subject matter.

Referring now to FIG. 6 showing an illustration of a map, in accordance with some embodiments of the disclosed subject matter. FIG. 6 exemplifies performing local optimization in search for the proposed location. A location of the user (620) is utilized in order to determine a best proposed waiting location. Based on User Location 620, target area in the vicinity of the user is determined (Area 610). Local optimization may be performed to find a proposed waiting location that is optimal within Area 610-Location 630.

Figure 7A:
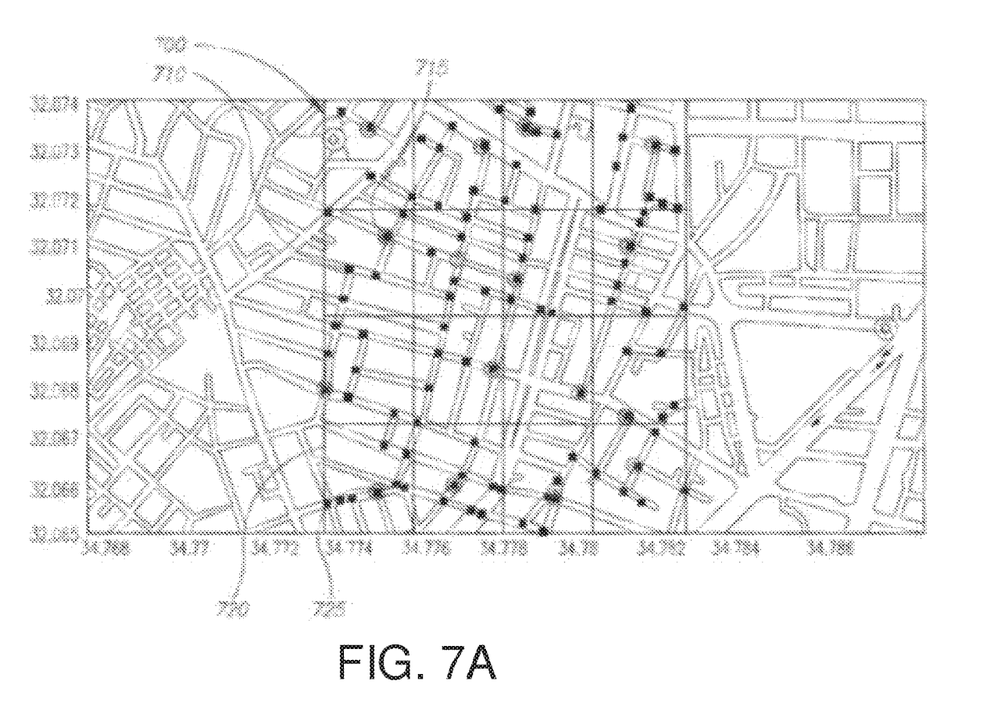
Figure 7B:
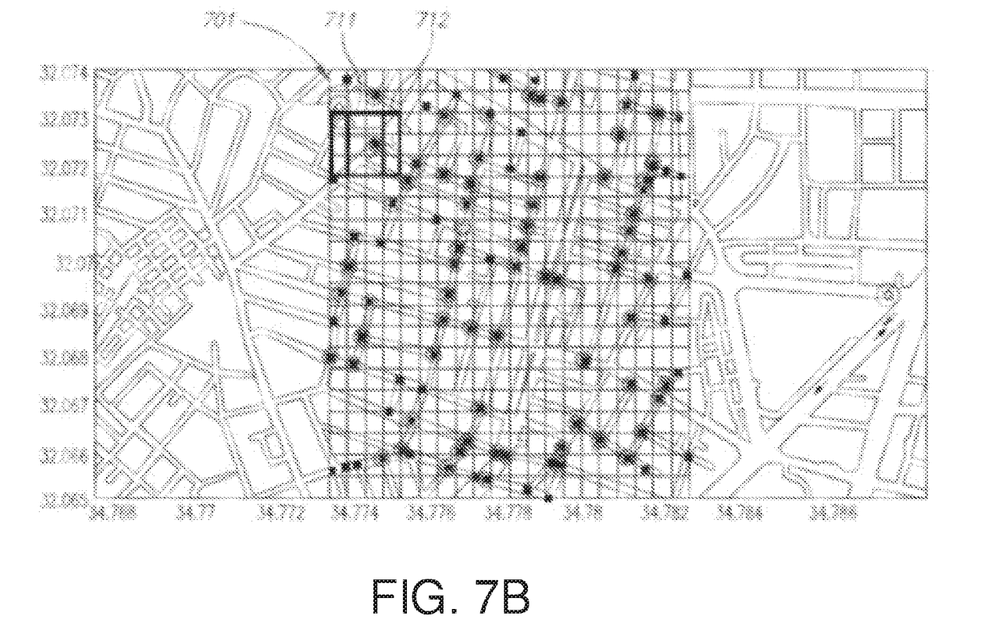
Figure 7C:
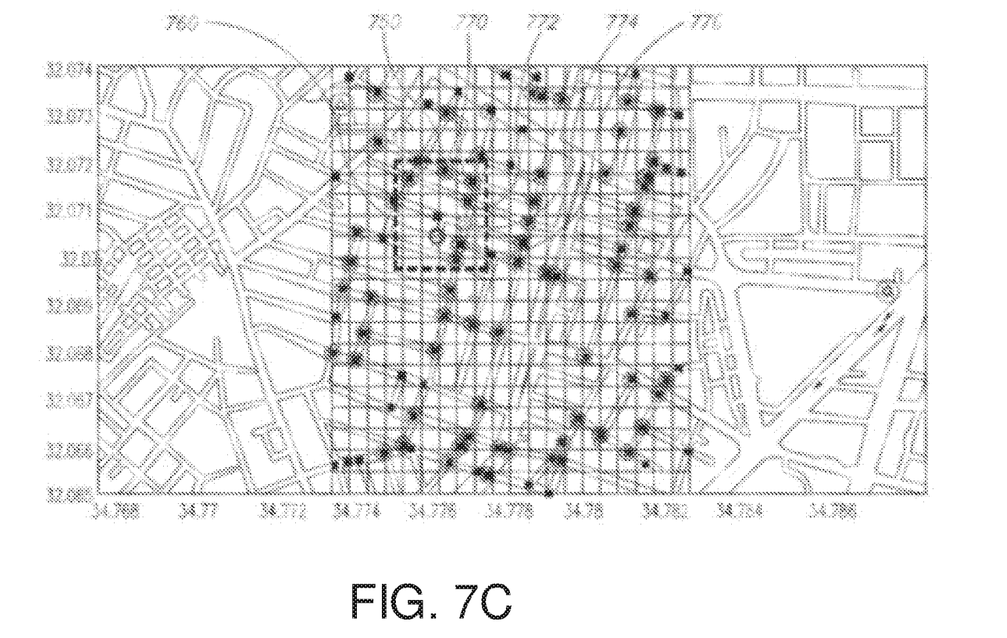

Referring now to FIGS. 7A-7C showing illustrations of maps, in accordance with some embodiments of the disclosed subject matter. FIGS. 7A-7C exemplify performing global optimization in search for the proposed location.

FIG. 7A shows dividing Area of Interest 700 into a grid of sub-areas, such as Sub-Area 710, Sub-Area 720, or the like. In each sub-area, an optimal waiting location may be independently computed (e.g., Location 715 in Sub-Area 710, Location 725 in Sub-Area 720).

The sub-areas may be of any size, shape, or the like. In some exemplary embodiments, the sub-areas may overlap one another, such as is exemplified in FIG. 7B, where Area of Interest 701 is divided into a grid of overlapping sub-areas, such as Sub-Area 711 and Sub-Area 712.

When a proposed location is required, User Location 760 is obtained, and Area 750 in which the proposed location is searched for may be determined based thereon. Potential locations that are compared may be the optimal waiting locations determined previously, such as Locations 770, 772, 774, 776. The selection of a location therefrom may be based on the location having a highest computed score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    computing a proposed location for a vehicle, wherein the proposed location is an approximated location where the vehicle can be located until a location-based event occurs in a geographical area, wherein the geographical area comprises a plurality of potential locations from which the proposed location where the vehicle can be located until a location-based event occurs is selected, wherein said computing comprises:
        computing, for each potential location within the geographical area, a measurement indicative of an estimated elapsed time until the location based event occurring in a proximity of the potential location; and
        selecting the proposed location from the potential location based on the computed measurements; and
    instructing a user to place the vehicle in the proposed location.

2. The method of claim 1, wherein the proposed location is a location for the vehicle to wait in until being notified of a location-based event issued by a mobile application of a client user.

3. The method of claim 1, wherein the proposed location is a location for the vehicle to wait in until being notified of a client transaction event having a location of the client.

4. The method of claim 3, wherein the client transaction event is an event indicating a client requesting a pickup at the location of the client.

5. The method of claim 1, wherein the measurement is a dominance measurement indicative of a number of parking spots that are dominated by the potential location.

6. The method of claim 1, wherein the measurement is a dominance measurement indicative of an accumulated probability that a parking spot dominated by the potential location will be vacated within a predetermined timeframe.

7. The method of claim 1, wherein the measurement is indicative of a distance between the potential location and locations that can be potentially associated with occurrences of the location-based event.

8. The method of claim 1, wherein the measurement is an accessibility measurement, wherein said computing the proposed location comprises:
    defining each junction within the geographical area as a potential location;
    for each potential location computing a distance metric from each other potential location, whereby determining for each potential location a vector of coefficients; and
    wherein said computing measurement comprises computing the accessibility measurement for the potential location based on the vector of coefficients.

9. The method of claim 1, further comprising:
    obtaining an indication of a target destination of the vehicle;
    determining the geographical area based on the target destination;
    wherein the location-based event is a parking vacated event;
    whereby providing to a driver of the vehicle a location in which the driver can wait until being notified of a parking spot being vacated and until being directed towards the parking spot.

10. The method of claim 1, wherein said computing is performed on a server in a batch process.

11. The method of claim 1, wherein said computing the proposed location is performed for a plurality of vehicles in a fleet of vehicles.

12. The method of claim 11, wherein said computing the proposed location accounts for a distribution of the fleet of vehicles.

13. The method of claim 11, wherein the measurement is indicative of locations of other vehicles of the fleet of vehicles.

14. The method of claim 11, wherein said selecting comprises selecting the proposed location that increases coverage of the fleet of vehicles over the geographical area.

15. A non-transitory computer readable storage medium retaining program instructions, which program instructions, when read by a processor of a computerized device, cause the processor to perform a method comprising:
   computing a proposed location for a vehicle, wherein the proposed location is an approximated location where the vehicle can be located until a location-based event occurs in a geographical area, wherein the geographical area comprises a plurality of potential locations from which the proposed location where the vehicle can be located until a location-based event occurs is selected, wherein said computing comprises:
      computing, for each potential location within the geographical area, a measurement indicative of an estimated elapsed time until the location based event occurring in a proximity of the potential location; and
      selecting the proposed location from the potential location based on the computed measurements; and
   instructing a user to place the vehicle in the proposed location.

16. The non-transitory computer readable storage medium of claim 15, wherein the proposed location is a location for the vehicle to wait in until being notified of a location-based event issued by a mobile application of a client user.

17. The non-transitory computer readable storage medium of claim 15, wherein the proposed location is a location for the vehicle to wait for a client transaction event having a location of a client.

18. The non-transitory computer readable storage medium of claim 17, wherein the client transaction event is an event indicating a client requesting a pickup at a location of the client.

19. The non-transitory computer readable storage medium of claim 15, wherein the measurement is indicative of a distance between the potential location and locations that can be potentially associated with occurrences of the location-based event.

20. The non-transitory computer readable storage medium of claim 15, wherein the measurement is an accessibility measurement, wherein said computing the proposed location comprises:
   defining each junction within the geographical area as a potential location;
   for each potential location computing a distance metric from each other potential location, whereby determining for each potential location a vector of coefficients; and
   wherein said computing the measurement comprises computing the accessibility measurement for the potential location based on the vector of coefficients.

21. The non-transitory computer readable storage medium of claim 15, wherein said computing the proposed location is performed for a plurality of vehicles in a fleet of vehicles.

22. The non-transitory computer readable storage medium of claim 21, wherein said computing the proposed location accounts for a distribution of the fleet of vehicles.

23. The non-transitory computer readable storage medium of claim 21, wherein the measurement is indicative of locations of other vehicles of the fleet of vehicles.

24. The non-transitory computer readable storage medium of claim 21, wherein said selecting comprises selecting the proposed location that increases coverage of the fleet of vehicles over the geographical area.

* * * * *